(12) United States Patent
Whight

(10) Patent No.: US 7,103,089 B2
(45) Date of Patent: Sep. 5, 2006

(54) MULTIBIT SPREAD SPECTRUM SIGNALING

(75) Inventor: Kenneth R. Whight, Horsham (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 964 days.

(21) Appl. No.: 09/732,194

(22) Filed: Dec. 7, 2000

(65) Prior Publication Data

US 2001/0038670 A1   Nov. 8, 2001

(30) Foreign Application Priority Data

Dec. 17, 1999   (GB) ..................... 9930004

(51) Int. Cl.
*H04B 1/69* (2006.01)
(52) U.S. Cl. ............... 375/143; 375/343; 375/150; 370/335
(58) Field of Classification Search ........... 375/142, 375/130, 222, 295, 143, 150, 343, 335; 370/335
See application file for complete search history.

(56) References Cited

U.S. PATENT DOCUMENTS 5,706,428 A    1/1998   Boer et al. ................. 395/200

FOREIGN PATENT DOCUMENTS

WO    WO 9721294    12/1996
WO    WO 9903225    7/1998

*Primary Examiner*—Stephen Chin
*Assistant Examiner*—Eva Zheng

(57) ABSTRACT

A method of transmitting and receiving a spread spectrum signal, wherein a product of a lower bit rate signal and a second PN-code equals the bit rate of a higher bit rate signal, and wherein a first PN-code sequence is used to spread the product or the higher bit rate signal to a predetermined output chip rate signal which is transmitted. At a receiver, the spread spectrum signal is received and demodulated and in a first operation the demodulated signal is correlated with the first PN-code sequence and in a second operation the output from the first mentioned correlating step is correlated with the second PN-code sequence. The demodulated signal is treated as either a higher bit rate signal or a lower bit rate signal based on the first and second correlations operations.

13 Claims, 6 Drawing Sheets

MULTIBIT SPREAD SPECTRUM SIGNALING

The present invention relates to multibit spread spectrum signalling and more particularly to a method of transmitting a spread spectrum signal, a method of recovering a spread spectrum signal, a spread spectrum communications system and to a spread spectrum receiver.

Low cost low power spread spectrum radio systems are being developed for use in the home for interactive control and the passing of data between hardware units. One such system is termed Firefly (formerly HomeRF Lite) and it is proposed to operate this system in the 2.4 GHz ISM band with a 200 kbps bit rate spread to 2.2 MHz using an 11 chip pseudo-random sequence. GMSK has been proposed for the modulation scheme as this minimises the out of band side lobes of the transmitted signal.

The 200 kbps bit rate can be transmitted and received over relatively short ranges but for longer ranges noise affects the quality of the recovered signal.

An object of the present invention is to effect successful transmission of a low power spread spectrum signal over a relatively long range.

According to one aspect of the present invention there is provided a method of transmitting a spread spectrum signal in which a product of a lower bit rate signal and a second PN-code equals the bit rate of a higher bit rate signal, and in which a first PN-code sequence is used to spread said product or a higher bit rate signal to a predetermined output chip rate.

According to a second aspect of the present invention there is provided a method of recovering a spread spectrum signal having one of a higher bit rate signal spread by a first PN-code sequence and lower bit rate signal spread by the product of the first PN-code sequence and a second PN-code sequence, a product of the lower bit rate and the chip rate of the second PN-sequence equalling the higher bit rate, comprising receiving and demodulating a spread spectrum signal, successively correlating in a first operation the demodulated signal with the first PN-code sequence and then in a second operation with the second PN-code sequence and determining if a higher bit rate signal is present by checking for the presence of a strong correlation peak in the output of the first operation and no correlation peak in the output of the second operation and if a lower bit rate signal is present by checking for the presence of at least a weak correlation peak in the output of the first operation and for the presence of a strong correlation peak in the output of the second operation.

According to a third aspect of the present invention there is provided a spread spectrum communications system comprising a transmitting station for transmitting a signal having one of a higher bit rate and a lower bit rate, the transmitting station comprising a source of a lower bit rate signal, means for multiplying the lower bit rate signal by a second PN-code sequence to give a product having a chip rate substantially equal to the bit rate of the higher bit rate signal, a source of the higher bit rate signal, means for multiplying the higher bit rate signal, if present, or said product, if present, by a first PN-code sequence to give a spread spectrum signal having a predetermined output chip rate signal, and at least one receiving station having means for receiving and demodulating the spread spectrum signal, first means for correlating the demodulated signal with the first PN-code sequence, second means for correlating the output from the first mentioned correlating step with the second PN-code sequence and means for determining the presence of a higher bit rate signal by checking for a strong correlation peak in the output of said first means and no correlation peak in the output of said second means and for determining the presence of a lower bit rate signal by checking for at least a weak correlation peak in the output of said first means and a strong correlation peak in the output of said second means.

According to a fourth aspect of the present invention there is provided a spread spectrum receiver for receiving at anyone time a signal having a higher bit rate spread by a first PN-code sequence and a signal having a lower bit rate which has been spread by the first PN-code sequence and a second PN-code sequence, the product of the lower bit rate and the second PN-Code sequence equalling the higher bit rate, the receiver comprising means for receiving and demodulating the spread spectrum signal, first means for correlating the demodulated signal with the first PN-code sequence, second means for correlating the output from the first mentioned correlating step with the second PN-code sequence and means for determining the presence of a higher bit rate signal by checking for a strong correlation peak in the output of said first means and no correlation peak in the output of said second means and for determining the presence of a lower bit rate signal by checking for at least a weak correlation peak in the output of said first means and a strong correlation peak in the output of said second means.

The provision of a low bit rate (LBR) channel enables a message to be received in the presence of noise that is sufficient to disrupt the high bit rate (HBR) channel.

A benefit of the making the product of the low bit rate and the second PN-code sequence equal to the high bit rate is in the recovering of the respective bit rate signals. Because of this relationship there will always be some degree of correlation required as a result of the first correlating operation using the first PN-code sequence. In the case of the spread spectrum signal being at the higher bit rate then a strong correlation peak will be detected but if it is at the lower bit rate a weak correlation peak will be detected. However in the latter case, a strong correlation peak will be detected as a result of the second correlating operation.

The high data rate channel may be de-spread using a high averaging gain to suppress noise. By this means a significant proportion of the theoretical maximum addition spreading gain can be realised whilst minimising the impact on the hardware and synchronisation time. The first and second correlating operations may be done in respective matched filters and in each of these operations a running average is carried to determine more precisely the location of the correlation peak.

The present invention will now be described, by way of example, with reference to the accompanying drawings, wherein.

Figure 3:
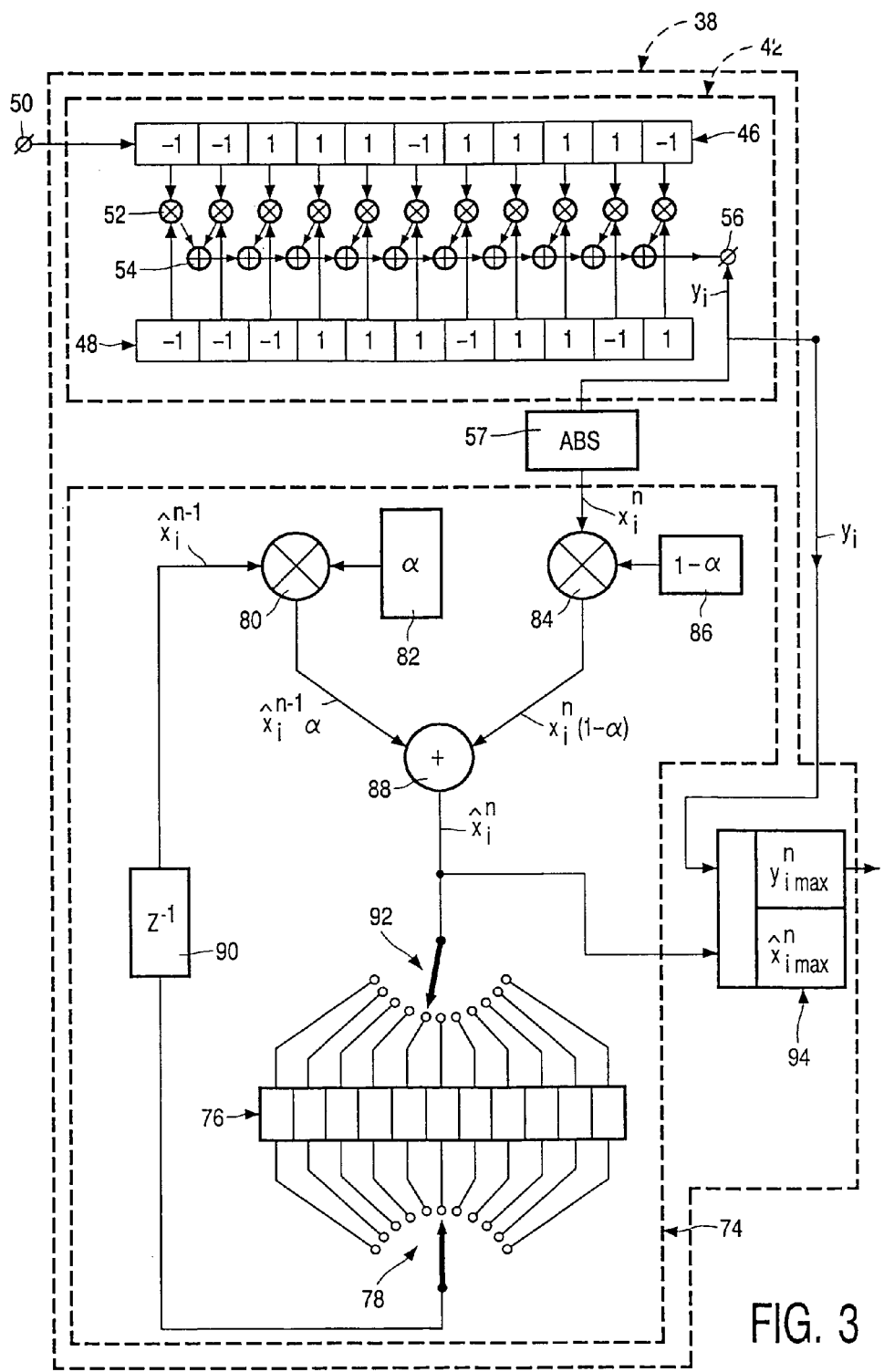
Figure 4:
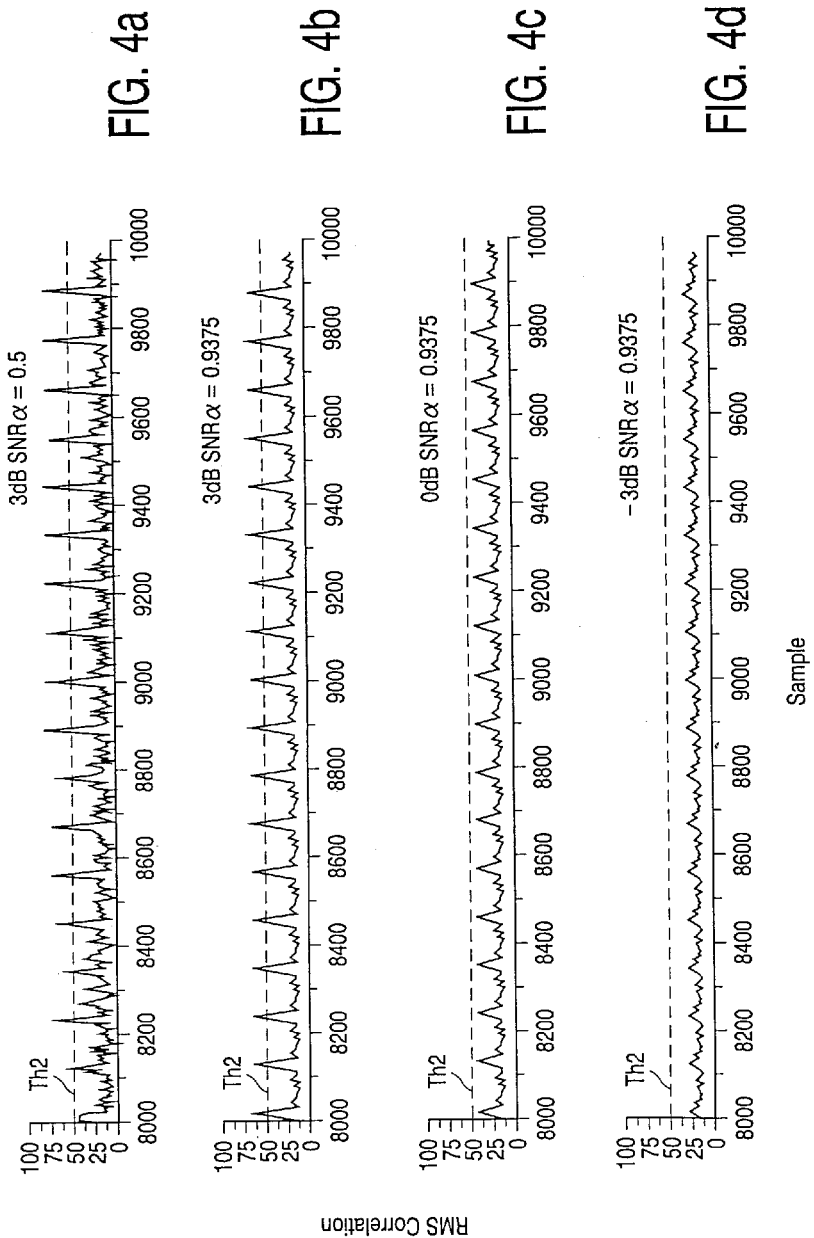
Figure 5:
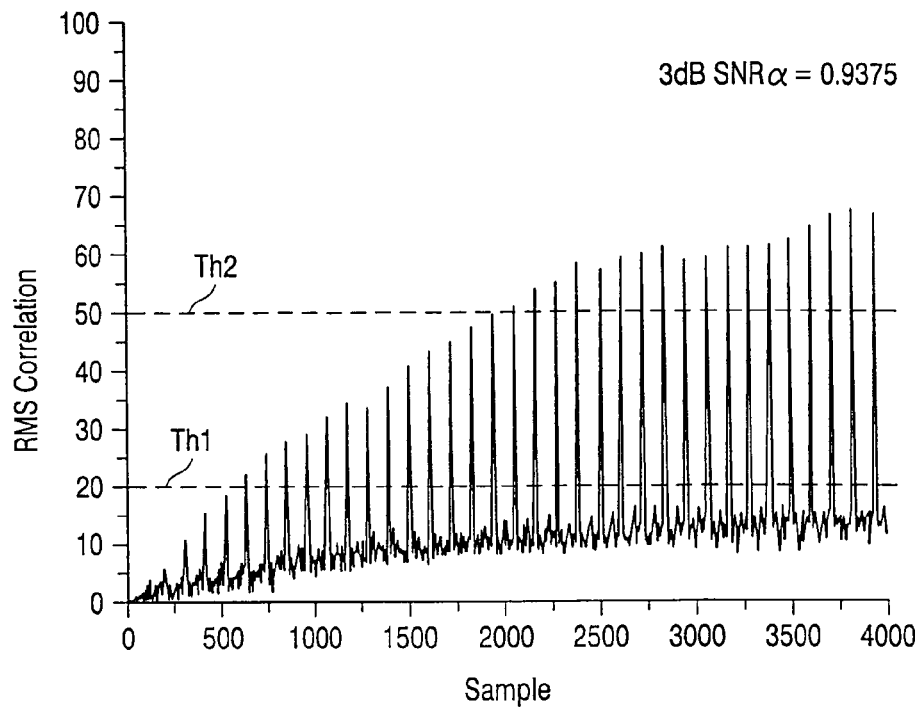
Figure 6:
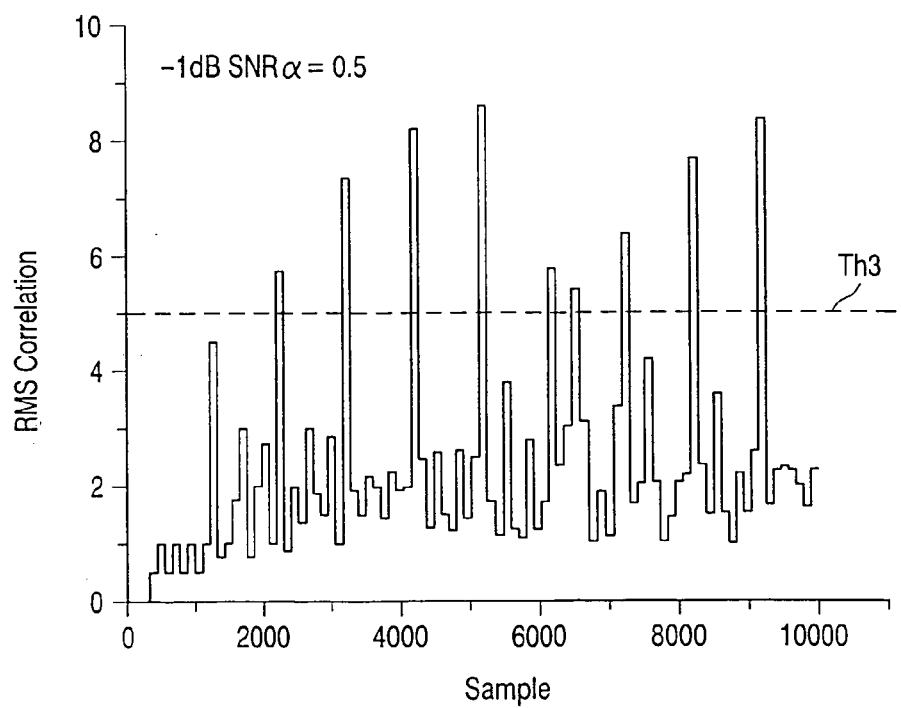
Figure 7:
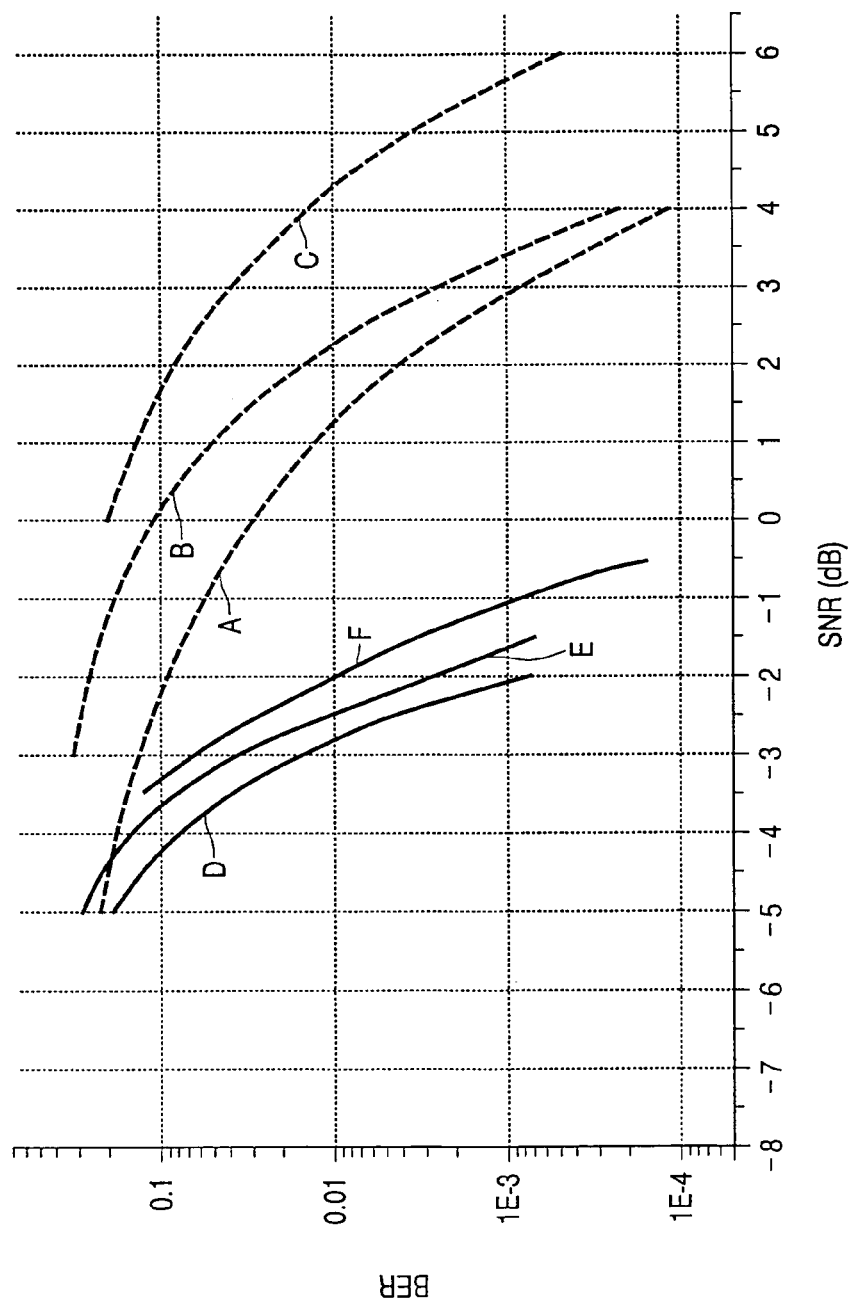

FIG. 3 is a block schematic diagram of a matched filter and a circuit for deriving a running average, FIGS. 4a, 4b, 4c and 4d respectively show RMS outputs for different averaging gains (a) and signal to noise ratios (SNRs), FIG. 5 is a graph relating to HBR signal detection, FIG. 6 is a graph relating to LBR signal detection, and FIG. 7 shows graphs of the cascaded matched filter Bit Error Rate (BER) versus Signal to Noise Ratio (SNR) comparing the respective performances at high and low bit rates.

In the drawings the same reference numerals have been used to represent corresponding features.

Figure 1:
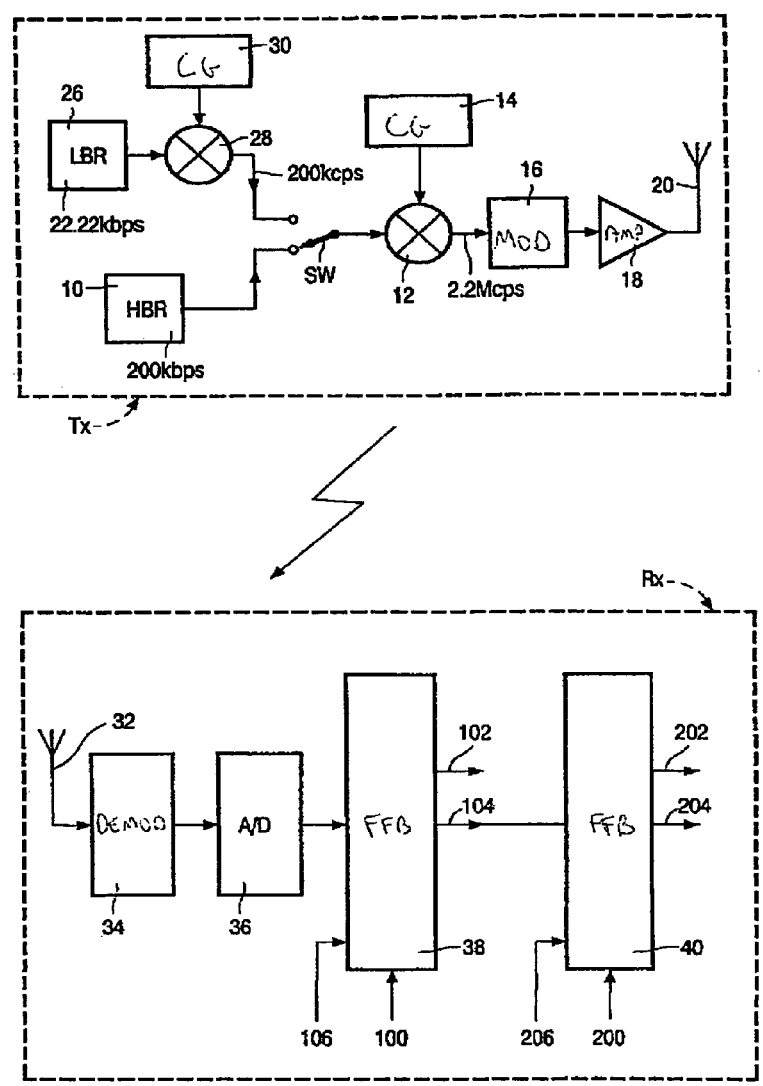
FIG. 1 is a block schematic diagram of a spread spectrum transmission system.

Referring to FIG. 1, the spread spectrum transmission system comprises a transmitter Tx and a receiver Rx. For convenience of description it will be assumed that the system operates in the 2.4 GHz ISM bandwidth and the encoded data signals are either a high bit rate (HBR) of 200 kbps or a low bit rate (LBR) of 22.22 kbps initially spread to 200 kcps using a 9 chip PN-code sequence.

The transmitter Tx comprises a high bit rate data source ("HBR") 10 which produces a plurality of symbols in the form of bits at 200 kbps. The symbols are supplied by way of a changeover switch SW to a multiplier 12 to which is connected a first code generator ("CG") 14 which supplies an 11 chip PN-code sequence. The 2.2 Mcps output of the multiplier 12 is supplied to a GFSK modulator ("MOD") 16, the output from which is amplified in a power amplifier ("AMP") 18 and propagated by an antenna 20.

A low bit rate data source ("LBR") 26 which produces a plurality of symbols in the form of bits at 22.22 kbps is coupled to a multiplier 28 to which is connected a second code generator ("CG") 30 which supplies a 9 chip PN-code sequence. The 200 kcps output from the multiplier 28 is supplied by way of the changeover switch SW, when switched over, to the multiplier 12 in which it is multiplied by the 11 chip PN-code sequence supplied by the first code generator 14 to provide a 2.2 Mcps output. Thereafter the output is processed in the same manner as the spread spectrum HBR signal. In either case the signal propagated by the antenna 20 is subject to noise.

At the receiver Rx, the propagated signal is received by an antenna 32 and is passed to an RF front end and demodulator ("DEMOD") 34. The output is supplied to a 1 bit analogue-to-digital converter 36 which supplies a 2.2 Mcps signal to a first filter function block ("FFB") 38 to be decoded.

In the filter function block 38 the 2.2 Mcps signal is over sampled by say a factor of 10. The block 38 has an input 100 for a HBR clock signal viz. 200 kHz, and two outputs, namely, output 102 for signal detect, viz. signal is either below a low threshold, between the low and a high thresholds or above the high threshold, and output 104 for bits out, that is, the higher bit rate decoded bit stream.

Another input (or inputs) 106 is (or are) provided in the block 38 for supplying (a) the PN-code sequence, (b) the averaging gain alpha (or a) which can take values in the range $0 \leq \alpha \leq 1$, and (c) the filter RMS signal higher and lower thresholds.

The output 104 of the first filter function block 38 comprises a signal at the higher (not oversampled) bit rate which is coupled to an input of a second filter function block ("FFB") 40. The block 40 has an input 200 for a LBR clock signal, viz. 22.22% Hz, and two output namely, output 202 for signal detect, which is "1" if a signal is believed to be present but otherwise it is zero and output 204 for bits out, that is, the decoded LBR stream.

Another input or inputs 206 is (or are) provided in the block 40 for supplying (a) the PN-code sequence, (b) the averaging gain alpha (or a) which can take the values in the range $0 \leq \alpha \leq 1$, and (c) the filter RMS signal threshold above which a signal is deemed to be present, given that the maximum possible RMS signal value is equal to the code length, that is, 9.

Figure 2:
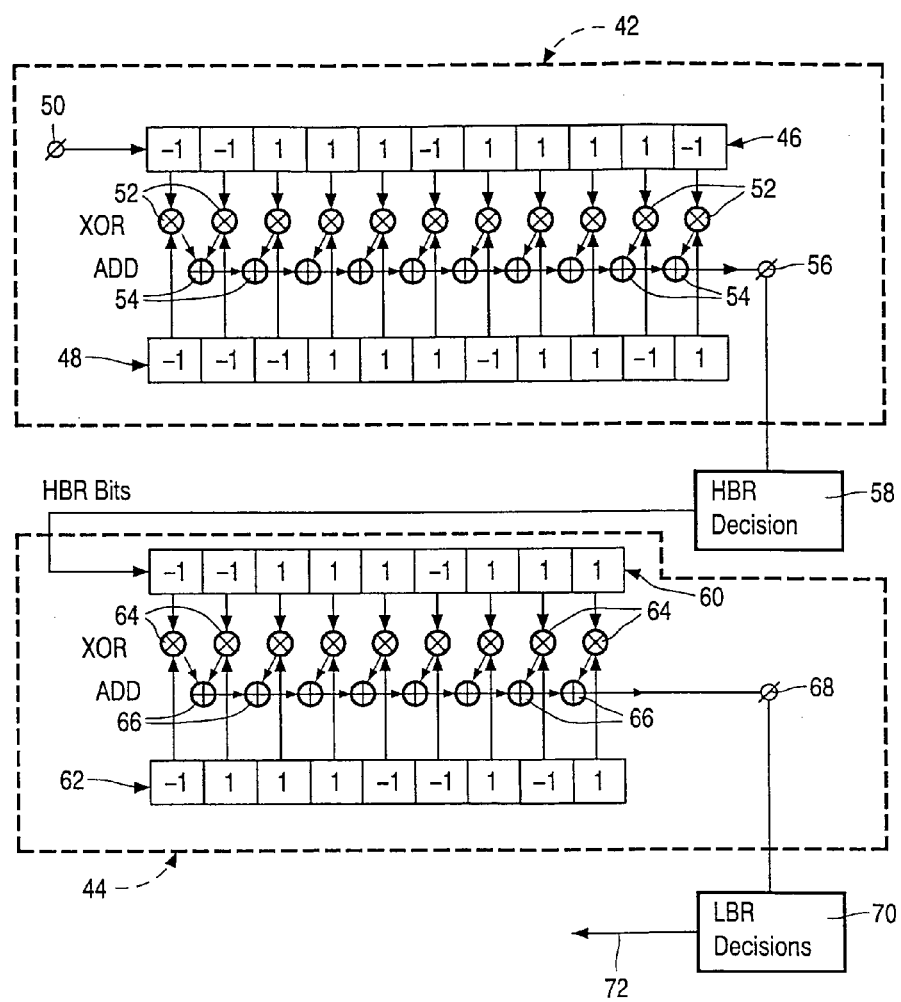
FIG. 2 is a block schematic diagram of a cascaded code matched filter.

FIG. 2 illustrates cascaded first and second matched filters 42, 44 for recovering the HBR data, if present, or the LBR data, if present. In the case of the first matched filter 42, it comprises 11 stage shift register 46 and a 11 stage register 48 for processing the ten times oversampled chip stream. For convenience of representation each of the stages of the shift register 46 and the register 48 is shown as a macro stage formed by 10 sub-stages. The macro stages of the register 48 stores the 11 chip PN-code sequence. The oversampled chip stream is applied to an input 50 of the shift register 46. Corresponding sub-stages of the registers 46, 48 are coupled to respective XOR gates 52 and their outputs are summed in summing stages 54 to provide a HBR output on a terminal 56. The terminal 56 is connected to a HBR decision stage 58. An output of the stage 58 provides HBR bits or effectively chips at the HBR to the second matched filter 44 which comprises 9 stage shift register 60 and a register 62. The register 60 receives the chips at the high bit rate from the decision stage 58 and the register 62 stores the 9 chips PN-code sequence. XOR gates 64 are coupled to outputs of corresponding stages of the shift register 60 and the register 62. The outputs of the XOR gates 64 are summed in summing stages 66 which provide a LBR output on a terminal 68. A LBR decision stage 70 is coupled to the terminal 68. The stage 70 makes a hard decision on the LBR bit value which appears on an output 72.

In operation a chip stream enters on the terminal 50 at the oversampled chip rate of 22 Mhz (assuming 10 times oversampling.) After each sample is clocked into the shift register, the XOR and addition operations are performed against the oversampled code and the oversampled high bitrate (HBR) output is passed to a decision stage 58 which makes, for every high data rate bit period, a soft or hard decision on the value of the corresponding high data rate bit. A soft decision implies that the actual filter correlation value is passed to the second stage of de-spreading, that is, the second matched filter 44, whilst a hard decision implies that the value passed to the second stage is the bit value ±1. The effect of a soft or hard decision on the bit error rate (BER) will be discussed later.

The decision stage 58 having made the decision at the high bit rate, its output is passed to the second stage of despreading in which the high bit rate bits enter a second shift register 60, clocked at the high bit rate (no oversampling), the XOR and addition operations are carried out with the second PN-code sequence stored in the register 62. The final low bit rate output on terminal 68 is then fed into the LBR decision stage 70 to make a hard decision on the LBR bit value.

A synchronisation technique to be described with reference to FIGS. 3 and 4 is used at the high bit rate with a high averaging gain, close to 1, so that the high bit rate bits can emerge from any noise with sufficient accuracy to make realistic progress to the next stage of de-spreading, that is, the second matched filter 44. The synchronisation technique described with reference to FIGS. 3 and 4 can also be used to make a hard decision on the LBR bit values.

The synchronisation technique referred to above will now be described with reference to FIG. 3. For convenience the technique will be described using the first filter function block 38 as an example but it is to be understood that the second filter function block 40 operates in the same manner using the second matched filter 44. The filter function block 38 includes the first matched filter 42 and a running average circuit 74. As the first matched filter 42 is the same as that described with reference to FIG. 2, in the interests of brevity it will not be described again.

Because of the autocorrelation properties of the first chip PN-code sequence, the filter output on the terminal 56 will peak within a bit period, in the absence of noise, at the instant when the local PN-code sequence stored in the shift register 48 is synchronised with the received code sequence and the sign of the peak will correspond to the sign of the transmitted bit. However in the presence of noise, spurious peaks in the filter output can result in erroneous bit determinations as the amplitude of the true, synchronised, peak can be reduced whilst the filter output signal can peak at other times within a bit period.

The running average circuit 74 enables synchronisation to be achieved by computing the running average of a RMS filter to allow the true signal to emerge from the noise. The computation is summarised by the following equation:

$$\hat{X}_i^n = \alpha * \hat{X}_i^{n-1} + (1-\alpha) * X_i^n$$

where $X_i^n$ is the absolute value of the ith matched filter output sample in the nth data bit period, $\hat{X}_i^{n-1}$ is the corresponding ith sample running average at the end of the n-1th data bit period, and $\alpha$ is the averaging gain and has a value $0 \leq \alpha \leq 1$. Typically $\alpha=0.5$ for a simple average and a higher value closer to 1 for the higher bit rate of a dual rate system.

An implementation of the circuit 74 comprises a multi-stage store 76 for storing at each location or register the current running average of each sample of the oversampled chips. Each register of the store 76 is coupled to a demultiplexing arrangement 78 so that each sample stored can be read-out in succession and applied by way of a delay element 90 to a calculating network. The calculating network, which processes the previous sample which has been delayed by the delay element 90, includes a first multiplier 80 in which the sample $\hat{X}_i^{n-1}$ is multiplied by $\alpha$ which is held in a store 82 to produce $\alpha * \hat{X}_i^{n-1}$. The corresponding output $y_i$ on the terminal 56 is applied to an absolute value stage 57 which provides a corresponding output $X_i^n$, where $X_i^n \equiv \text{abs } y_i^n$, which is applied to a second multiplier 84 and is multiplied by $(1-\alpha)$ held in a store 86 to produce $(1-\alpha)X_i^n$. The outputs produced by the first and second multipliers 80, 84 are combined in a summation stage 88 to produce the new running average $\hat{X}_i^n$ which is applied to a multiplexer 92 which is connected to the register of the store 76 immediately prior to the register from which the previous corresponding running average value was read out and the new value is stored.

During successive bit periods, a process is implemented to find the maximum value of $\hat{X}_i^n$. At the beginning of a bit period the value stored in the first location is treated as a maximum and the next following value is compared in a comparison stage 94 with the first one and, if it is larger, it becomes the new maximum and simultaneously the corresponding matched filter output sample value is stored. This process is continued and by the end of the bit period it is known which sample of the matched filter output 56 corresponds to the maximum $y_{i\ max}^n$ and its sign (positive or negative) is used to make a hard decision on the bit value. If it is desired to make a soft decision, the value $y_{i\ max}^n$ at the end of the bit period is used. Whilst it is necessary to store all the values of $\hat{X}_i^n$ for the next data bit, it is not necessary to store all the samples $X_i^n$. All that it is required to store during a given bit period are the current maximum of $\hat{X}_i^n$, and the corresponding value of the filter output $y_{i\ max}^n$. The decision made on $y_{i\ max}^n$ within the comparison stage 94, is the output.

In order to determine if a signal exists in a channel, the magnitude of the correlation peaks in the HBR and LBR bit value decision blocks 58, 70, respectively, are examined and a threshold Th2 above which a signal is deemed to be present is set. The following description with respect to FIGS. 4a to 4d disclose how this can be achieved when different averaging factors are used in the two stages of despreading. In FIGS. 4a to 4d the abscissa represents sample numbers and the ordinates respectively show Root Mean Square (RMS) correlation. The respective traces show the effect, on the stored RMS correlation, of varying both the averaging gain $\alpha$ and the signal to noise ratio (SNR), in the case of FIG. 4a $\alpha=0.5$ and the SNR=3 dB, FIG. 4b $\alpha=0.9375$ and SNR=3 dB, FIG. 4c $\alpha=0.9375$ and SNR=0 dB and in FIG. 4d $\alpha=0.9375$ and SNR=−3 dB. An examination of these Figures shows that for a higher value of the averaging gain $\alpha$, a cleaner correlation results. Also the Figures show that as the SNR decreases then the correlation peaks submerge into a noise floor with a mean correlation value of approximately 15.

Setting the threshold Th2 for the detection of a signal is therefore a matter of deciding what bit error rate can be tolerated, and therefore the corresponding limiting SNR value and the averaging gain $\alpha$ to obtain acceptably clean RMS correlation peaks with a value above the threshold.

The value set for the signal detection threshold will affect the number of bits that need to be received before it is recognised that a signal is present. FIG. 5 shows how the high bit rate RMS correlation signal at 3 dB SNR with $\alpha=0.9375$ evolves, from an initial state of stored zeros, as data starts to arrive. For rapid signal detection a threshold Th1 is set that is safely above the noise floor but not too far above e.g. ∼20 in FIG. 5 yielding 6 received bits necessary for signal detection. To be assured of a low BER, the threshold Th2 is set just below the minimum steady state peak height at the limiting SNR assumed in this example to be at 3 dB. Then, as shown in FIG. 5, the threshold Th2 of the order of 50 would be crossed in the downward direction if the SNR deteriorated below 3 dB. Referring to FIG. 7, which will be described in greater detail later, a BER of better than approximately 1.0e−3 (or $10^{-3}$) can be expected when the correlation peaks exceed the threshold Th2, as shown in the right hand portion of FIG. 5.

The two thresholds Th1, Th2 enable the receiver to indicate whether the signal strength is sufficient for high or low data rate reception. By using a memory to store the received high data rate bits in the interval between the passing of these two thresholds then fast synchronisation onto a high bit rate signal can be achieved without loss of high bit rate data.

The high bit rate signal would be further indicated by a continuing absence of a signal detect at the low data rate. FIG. 6 show the RMS correlation, equivalent to FIG. 5, for the low bit rate signal with an averaging gain of $\alpha=0.5$. From this figure a signal threshold Th3 value of 5 would result in signal detection after two low data rate bits at a BER of ∼1.0e−3 given the −1 dB SNR (see FIG. 7 curve "F"). The state of the signal detect flags would enable the receiver to determine for itself the bit rate of any received signal.

Table 1 indicates the state of the signal detect flags under the possible signal reception conditions whilst Table 2 summarises the matched filter parameter values recommended to achieve 1e−3 BER quality at the two bit rates.

TABLE 1

| Signal State | High Bit Rate Low Threshold Th1 | High Bit Rate High Threshold Th2 | Low Bit Rate Threshold Th3 |
|---|---|---|---|
| No Signal | 0 | 0 | 0 |
| High Bit Rate Signal | | | |
| Good BER | 1 | 1 | 0 |
| Poor BER | 1 | 0 | 0 |

TABLE 1-continued

| Signal State | High Bit Rate Low Threshold Th1 | High Bit Rate High Threshold Th2 | Low Bit Rate Threshold Th3 |
|---|---|---|---|
| Low Bit Rate Signal | 1 | 0 | 1 |

TABLE 2

| Filter Parameter | High Bit Rate | Low Bit Rate |
|---|---|---|
| Averaging gain α | 0.9375 | 0.5 |
| Low Signal Detect Threshold | 20 | 5 |
| High Signal Detect Threshold | 50 | 5 |
| SNR Limit dB (BER ≈ $10^{-3}$) | 3 | −1 |

Other conclusions which can be made from monitoring the above-mentioned thresholds Th1, Th2 and Th3 are (a) if there are strong correlation peaks for both high and low bit rates, the signal is LBR but may be HBR, (b) if there is a weak correlation peak for high bit rate and no correlation peak for the low bit rate, the signal could be a poor quality HBR, (c) if two thresholds were implemented at the LBR and if there are weak correlation peaks for both high and low bit rates, the signal is likely to be a poor quality LBR, and (d) if there is no high bit rate correlation peak and a strong-weak low bit rate correlation peak, the conclusion is that it would be an impossible condition. In the case of conclusions (a), (b) and (c) an output decision could be generated but it being flagged to indicate a low confidence decision.

FIG. 7 shows the BER curves obtained via simulation as a function of signal to noise ratio (SNR), approximately 10,000 bits were simulated at the high and low bit rates, respectively. Curve A represents the ideal performance of a perfectly synchronised matched filter operating at the high data rate. Curve B represents the performance of a synchronised matched filter with an averaging gain α of 0.5 operating at the high data rate. Curve C represents the performance of a conventional matched filter operating at the high data rate without any synchronisation. Curve D represents the ideal performance of cascaded pseudo-random code matched filter system with an averaging gain of 0.5 in which the first stage filter is of length 990 and no decision is made on the high data rate bits. This implies that the second shift register is clocked at the oversampled chip rate (22 MHz). This system is roughly equivalent to a length 99 pseudo-random sequence 10 times oversampled de-spreading process. Curve E represents the performance of a cascaded code filter with a 0.9375 averaging gain at the high data rate and a 0.5 averaging gain at the low data rate together with a soft decision on the high data rate bit. Lastly, curve F represents the performance of an identical cascaded code filter as in the LBR soft decision case except that a hard decision is made on the high data rate bit.

From these curves it can be seen that only a small −0.5 dB penalty is paid for the much simpler hardware implementation of a hard decision between stages and that a 4.5 dB advantage can be gained when employing the low data rate. Whilst this improvement is only half of the possible 9 dB expected of an ideal 9 chip code it should be realised that at such short code lengths the perfect orthogonality assumption for the pseudo-random sequences is not well satisfied. Further as the synchronisation process would be costly to implement on a 990 length shift register in reality only 6 dB is available assuming perfect orthogonality as is evident from a comparison of the HBR conv and HBR sync curves.

A higher averaging gain in both stages of de-spreading would result in small improvements in performance but the quoted figures represent a good compromise between performance, synchronisation speed and hardware complexity. With regard to synchronisation speed it should be noted that the filter performance before the averaging has taken effect is always equal to or better than the equivalent conventional unsynchronised filter. If the noise is low then correct databits will emerge as soon as a signal is received, it merely takes time for the RMS filter peak to pass the threshold that indicates the unambiguous detection of a signal.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of spread spectrum systems and component parts therefore and which may be used instead of or in addition to features already described herein.

The invention claimed is:

1. A method of transmitting a spread spectrum signal, the method comprising:
   multiplying a lower bit rate signal and a first PN-code sequence to yield a lower bit rate product; and
   using a second PN-code sequence to spread one of the lower bit rate product or a higher bit rate signal to a predetermined output chip rate for the spread spectrum signal,
   wherein the lower bit rate product has a chip rate equal to a bit rate of the higher bit rate signal.

2. A method of recovering a spread spectrum signal having one of a higher bit rate signal spread by a first PN-code sequence or a lower bit rate signal spread by the first PN-code sequence and a second PN-code sequence, a lower bit rate product of the lower bit rate signal and the second PN-code sequence having a chip rate equaling a bit rate of the higher bit rate single, the method comprising:
   receiving and demodulation the spread spectrum signal;
   successively correlating in a first operation the demodulated signal with the first PN-code sequence and then in a second operation with the second PN-code sequence; and
   determining if the higher bit rate signal is present in the spread spectrum signal by checking a presence of a first strong correlation peak in an output of the first operation and an absence of a correlation peak in an output of the second operation;
   determining if the lower bit rate signal is present in the spread spectrum signal by checking a presence of at least a weak correlation peak in the output of the first operation and a presence of a second strong correlation peak in the output of the second operation.

3. The method of claim 2, wherein the first operation and the second operation are carried in respective matched filters.

4. The method of claim 3, wherein a running average of an output of the each matched filter is obtained in order to synchronize detection of one ore more correlation peaks in the output of the respective filter.

5. The method of claim 4, wherein the running average is determined in accordance with the equation:

$$\hat{X}_i^n = \alpha * \hat{X}_i^{n-1} + (1-\alpha) * X_i^n$$

where $X_i^n$ is the absolute value of the ith matched filter output sample in an nth databit period, $\hat{X}_i^{n-1}$ is the corresponding ith sample running average at an end of an n–1th databit period, and $\alpha$ is an averaging gain and has a value $0 \leq \alpha \leq 1$.

6. The method of claim 5, wherein the averaging gain $\alpha$ has a value >0.5.

7. A spread spectrum communication system, comprising:
a transmitter for transmitting a spread spectrum signal, the transmitter including
 a source of a higher bit rate signal having a higher bit rate,
 a source of a lower bit rate signal having a lower bit rate,
 means for multiplying the higher bit rate signal by a first PN-code sequence to give the spread spectrum signal a predetermined output chip rate, and
 means for multiplying the lower bit rate signal by the first PN-code sequence and a second PN-code sequence to give the spread spectrum signal the predetermined output chip rate, wherein a lower bit rate product of the lower bit rate signal and the second PN-code sequence has a chip rate equal to the higher bit rate of the higher bit rate signal; and
a receiver including
 means for receiving and demodulation the spread spectrum signal,
 first correlation means for correlating the demodulated signal with the first PN-code sequence,
 second correlation means for correlating an output from the first correlation means with the second PN-code sequence,
 means for determining a presence of the higher bit rate signal in the spread spectrum signal by checking for a first strong correlation peak in the output of said first correlation means and an absence of a correlation peak in an output of the second correlation means, and
 means for determining the presence of the lower bit rate signal in the spread spectrum signal by checking for at least a weak correlation peak in the output of the first correlation means and a second strong correlation peak in the output of said second correlation means.

8. The spread spectrum communication system of claim 7, wherein the first operation and the second operation are carried in respective matched filters.

9. spread spectrum communication system of claim 8, wherein the receiver further includes:

means for obtaining a running average of an output of each filter; and
means for determining synchronizing peaks in the respective running averages.

10. A spread spectrum receiver for recovering a spread spectrum signal having one of a higher bit rate signal spread by a first PN-code sequence or a lower bit rate signal spread by the first PN-code sequence and a second PN-code sequence, a lower bit rate product of the lower bit rate signal and the second PN-sequence having a chip rate equaling a bit rate of the higher bit rate signal, the receiver comprising:
 means for receiving and demodulation the spread spectrum signal;
 first correlation means for correlating the demodulated signal with the first PN-code sequence;
 second correlation means for correlating an output from the first correlation means with the second PN-code sequence;
 means for determining a presence of the higher bit rate signal in the spread spectrum signal by checking for a first strong correlation peak in the output of said first correlation means and an absence of a correlation peak in an output of the second correlation means, and
 means for determining the presence of the lower bit rate signal in the spread spectrum signal by checking for at least a weak correlation peak in the output of the first correlation means and a second strong correlation peak in the output of said second correlation means.

11. The receiver of claim 10, wherein the first operation and the second operation are carried in respective matched filters.

12. The receiver of claim 10, further includes:
 means for obtaining a running average of an output of each filter; and
 means for determining synchronizing peaks in the respective running averages.

13. A spread spectrum transmitter for transmitting a spread spectrum signal, the transmitter comprising:
 a source of a first bit rate signal having a first bit rate;
 a source of a second bit rate signal having a second bit rate;
 means for multiplying the first bit rate signal by a first PN-code sequence to give the spread spectrum signal a predetermined output chip rate; and
 means for multiplying the second bit rate signal by the first PN-code sequence and by a second PN-code sequence to give the spread spectrum signal the predetermined output chip rate, wherein a second bit rate product of the second bit rate signal and the second PN-code sequence have a chip rate equal to the first bit rate of the first bit rate signal.

* * * * *